(12) United States Patent
Szilagyi et al.

(10) Patent No.: US 7,228,047 B1
(45) Date of Patent: Jun. 5, 2007

(54) BREAKOUT AND CONNECTOR ASSEMBLIES FOR USE WITH HIGH COUNT FIBER OPTIC CABLES

(75) Inventors: B. Daniel Szilagyi, Naperville, IL (US); Malcolm R. Phifer, Plainfield, IL (US); Thomas D. Schiltz, Bolingbrook, IL (US); Laima Katarziene, Lockport, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/454,591

(22) Filed: Jun. 16, 2006

(51) Int. Cl.
*G02B 6/00* (2006.01)

(52) U.S. Cl. .................. 385/134; 385/86; 385/135; 385/137

(58) Field of Classification Search .............. 385/65, 385/83–86, 113–114, 134–139
See application file for complete search history.

(56) References Cited

U.S. PATENT DOCUMENTS

2006/0153517 A1* 7/2006 Reagan et al. .............. 385/135

2006/0233506 A1* 10/2006 Noonan et al. ............. 385/134

\* cited by examiner

*Primary Examiner*—Hemang Sanghavi
(74) *Attorney, Agent, or Firm*—Romi N. Bose

(57) ABSTRACT

An adapter assembly comprises a cable ferrule that terminates environmental and strength members of a high count fiber optic cable while allowing a plurality of optical fibers to pass therethrough. A flange on the cable ferrule mates with a corresponding groove of a breakout body. A breakout body cover is provided to enclose an open longitudinal channel of the breakout body. Flexible jacketing may be coupled to an end of the breakout body with a traversing plurality of optic fiber encased in the flexible jacketing. In another aspect of the present invention, a modular connector assembly is provided that may be configured in both a pulling configuration (for installation of the cable assembly) and a connector configuration (for termination of the optical fibers). In this manner, relatively inflexible high count fiber optic cables may be transitioned into more flexible configurations for subsequent termination in a relatively inexpensive manner.

21 Claims, 8 Drawing Sheets

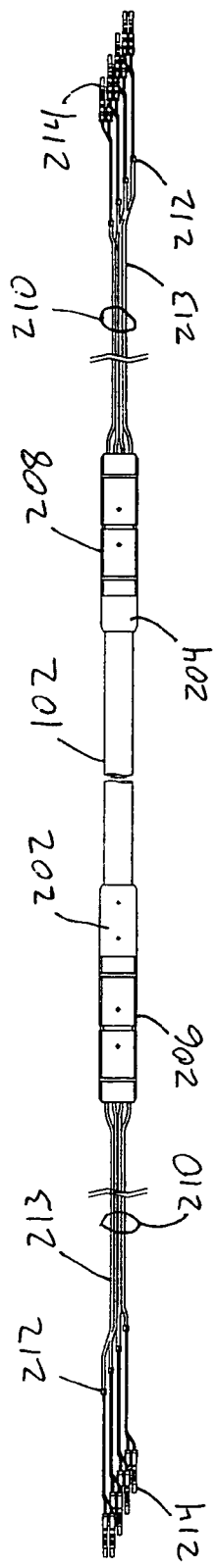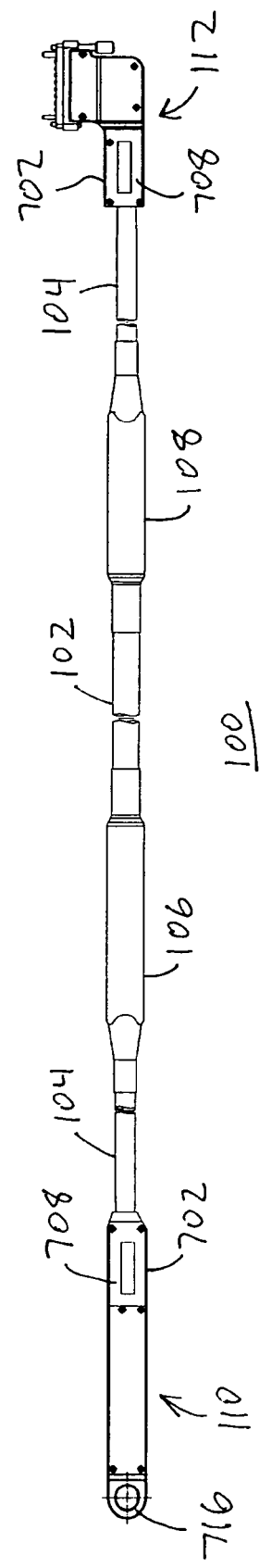

BREAKOUT AND CONNECTOR ASSEMBLIES FOR USE WITH HIGH COUNT FIBER OPTIC CABLES

FIELD OF THE INVENTION

The present invention relates generally to fiber optic cables and adapters/connectors for use therewith and, in particular, to breakout and connector assemblies for use with high count fiber optic cables.

BACKGROUND OF THE INVENTION

High count fiber optic cables are well known in the art. For example, a typical outdoor cable may comprise several dozen fiber optic ribbons, each ribbon typically comprising up to twelve individual optical fibers, in a single cable. Such cables are particularly useful for communication equipment that terminates a large number of optical fibers, such as, for example, routers or switches used in a large-scale communication network. It is not unusual for multiple pieces of such communication equipment to be located in different buildings, thereby requiring connections between buildings. To this end, high count, outdoor fiber optic cables are typically used to connect such communication equipment together.

Given the environment in which they must perform, as well as the large number of fibers carried within, high count outdoor fiber optic cables typically include several structural strengthening members (e.g., plastic or metal wires or jackets capable of withstanding the tensional or pulling forces that may be applied to the cable) as well as several environmental protection layers (e.g., water-proof insulating layers). While the resulting cable is well suited for the environment in which it operates, the structural and environmental enhancements provided in outdoor cable make it relatively stiff. The stiffness of the outdoor cable, as a consequence, makes it difficult to work with when attempting to terminate the outdoor cable, and its constituent optical fibers, at the communication equipment.

Prior art solutions to the problems of terminating outdoor cables, while workable, have proven less than satisfactory. For example, when transitioning from outdoor cable to indoor connections, a typical solution is to use one or more splice boxes having outdoor cable on one side and indoor fiber optic cable and connectors/adapters on the other. While this solution is serviceable, it requires additional work for mounting and deploying the splice boxes and it is therefore relatively expensive to implement. Consequently, it would be advantageous to provide relatively inexpensive means for transitioning from outdoor fiber optic cables to more flexible, indoor cables that may be subsequently routed and terminated at the equipment of interest.

SUMMARY OF THE INVENTION

The present invention provides various assemblies for terminating high count fiber optic cables and their constituent optical fibers. In one embodiment of the present invention, an adapter assembly comprises a cable ferrule that terminates the environmental and strength members of a high count fiber optic cable while allowing a plurality of optical fibers to pass therethrough. A flange is provided on an exterior surface of the cable ferrule. A breakout body is further provided comprising a groove formed in an interior surface near one end of the breakout body and configured to accept the flange of the cable ferrule. The breakout body comprises an open longitudinal channel between open ends of the breakout body, thereby allowing the plurality of optic fibers to pass through. A breakout body cover is provided to enclose the open longitudinal channel of the breakout body. In a presently preferred embodiment, more flexible jacketing may be coupled to the other end of the breakout body (opposite the cable ferrule) and the breakout body cover, with the traversing plurality of optic fiber encased in the flexible jacketing. In a presently preferred embodiment, a pulling member may be attached to the cable ferrule and passed through the longitudinal channel formed by the breakout body and breakout body cover, thereby allowing the resulting cable assembly to be pulled through an appropriate conduit. Furthermore, the breakout body is preferably equipped with one or more partitions disposed within the open longitudinal channel and defining at least two courses for receiving the plurality of optical fibers. The one or more partitions may likewise comprise one or more retention recesses that may be used to securely align each of the plurality of optic fibers. In the manner, the adapter assembly of the present invention facilitates a transition from relatively stiff high count fiber optic cables to more flexible cables without sacrificing the integrity of the optical fibers.

In another embodiment of the present invention, a dual-purpose assembly for both installing the high count fiber optic cable and for terminating the plurality of optical fibers is provided. In particular, the assembly comprises a rear base configured to receive the plurality of optic fibers via a back end of the rear base, and further comprising a first coupling portion disposed proximate an opposing front end of the rear base. A post is preferably disposed within the open longitudinal channel and configured to secure a proximate end of the pulling member (whose distal end, as described above, is coupled to the cable ferrule). When the assembly is configured in a pulling configuration, a front pulling base comprising a second coupling portion is coupled to the rear base via the first and second coupling portions. The front pulling base comprises a first cavity for receiving the plurality of optical fibers (including fiber optic ferrules used to terminate the optical fibers). A front pulling cover is provided that substantially encloses the first cavity and, in cooperation with the front pulling base, comprises a pulling portion for connection thereto of a pulling device. In this configuration, the resulting cable assembly may be pulled through any necessary conduits to route the cable to its destination. Once pulled through the appropriate conduits, the front pulling base and the front pulling cover may be removed from the rear base and a front backshell base, comprising a third coupling portion, may be mated with the rear base via the first and third coupling portions. Using the front backshell base, and a cavity provided therein, the plurality of optical fibers may be terminated in an appropriate connector held in position by the front backshell base and a cooperating front backshell cover. In this manner, the present invention provides the ability to terminate relatively inflexible outdoor fiber optic cables and transition them into more flexible indoor configurations in a relatively inexpensive manner.

BRIEF DESCRIPTION OF THE DRAWINGS

The features of the present invention are set forth with particularity in the appended claims. The present invention itself, together with further features and attendant advantages, will become apparent from consideration of the following detailed description, taken in conjunction with the accompanying drawings. One or more embodiments of the invention are now described, by way of example only, with reference to the accompanying drawings in which:

FIG. 1 is an illustration of a cable assembly in accordance with the present invention;

FIG. 2 is an illustration of the cable assembly of FIG. 1 in which the outer jacketing layers of the adapter assemblies, and the connector and pulling assemblies of the present invention had been removed;

DETAILED DESCRIPTION OF THE PRESENT EMBODIMENTS

Figure 3:
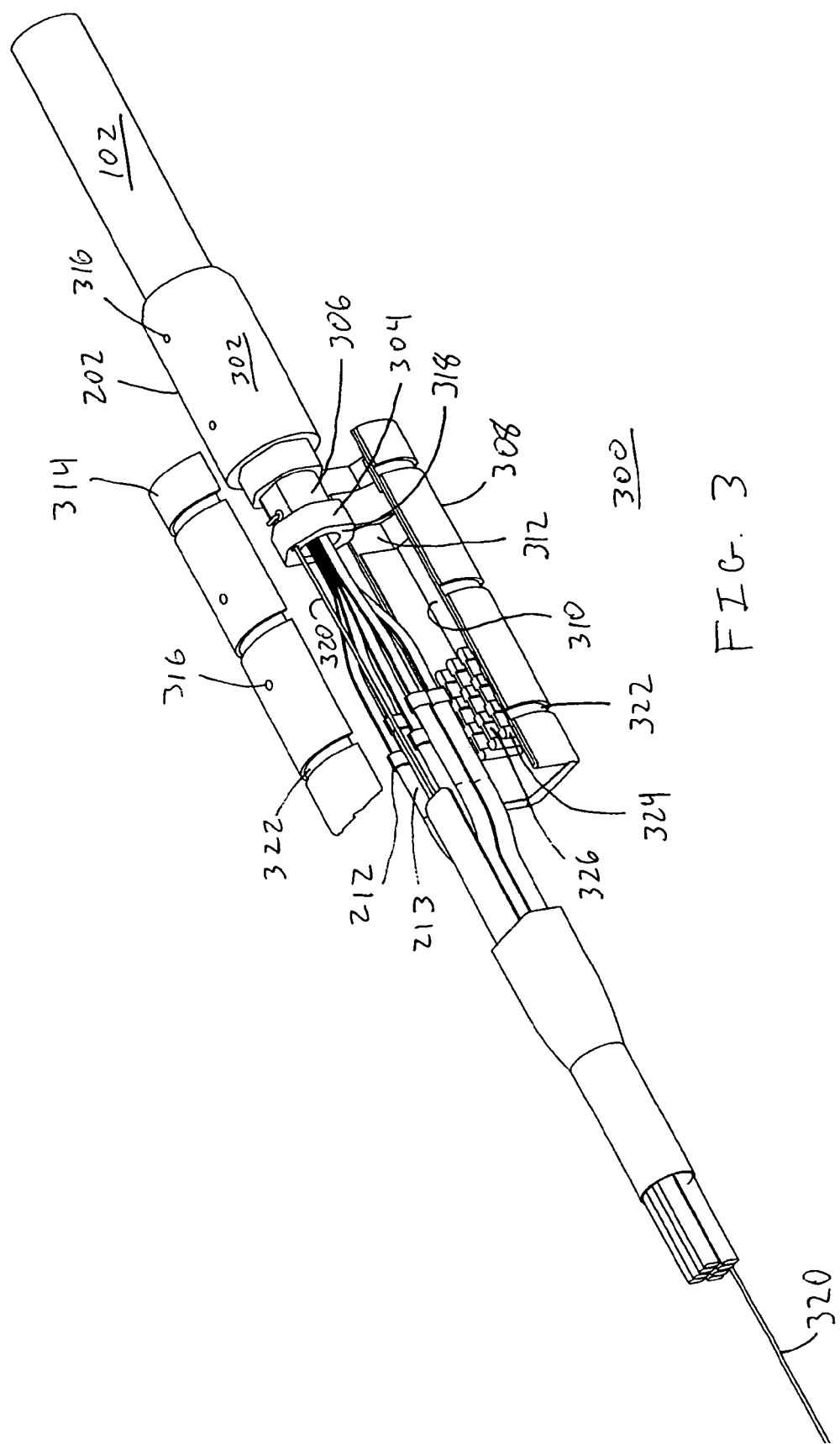
FIG. 3 is an exploded, perspective view of a first embodiment of the adapter assembly in accordance with the present invention.

Referring now to FIG. 1, an exemplary cable assembly 100 in accordance with the present invention is illustrated. The cable assembly 100 comprises a high count fiber optic cable 102 having adapter assemblies 106, 108 attached thereto that transition to lengths of flexible cable 104 that, in turn, are terminated by a pulling assembly 110 and, optionally, a connector assembly 112. In a presently preferred embodiment, the high count fiber optic cable 102 comprises outdoor cable, although the present invention may be adapted for use with virtually any type of high count fiber optic cable. For example, such cables typically comprise several dozen fiber optic fibers and, in a presently preferred embodiment, comprises 192 optical fibers. Furthermore, although virtually any suitable length may be employed for the high count fiber optic cable 102, a presently preferred length is between 7 and 8 meters.

The adapter assemblies 106, 108 terminate at least some, preferably all, structural and environmental protection members of the cable 102 while allowing the optical fibers contained therein and a pulling member (described below) to pass through. The structures of the adapter assemblies 106, 108 are further described with reference to FIGS. 2–6 below. As shown, each adapter assembly 106, 108 preferably comprises an outer shrink wrap tubing or other environmentally protective enclosure as known to those having skill in the art. The flexible cable 104 comprises the optical fibers passing through the adapter assemblies 106, 108 and the pulling member that, collectively, are encased in a flexible covering such as "ROUNDIT" or any other similar flexible, suitable sleeving material. In a presently preferred embodiment, each length of flexible cable 104 is approximately 2.5 meters in length although, once again, the present invention is not necessarily limited in this regard.

As described in greater detail below with further reference to FIGS. 7 and 8, the pulling assembly 110, due to its narrow profile, allows the cable assembly 100 or at least portions thereof to be pulled through appropriate conduit, as known in the art. Given the flexibility of the flexible cable 104, the pulling assembly 110 can be brought directly into a facility or building comprising the necessary equipment for terminating the optic fibers once the pulling assembly 110 has been used to properly place the cable assembly 100 in proximity to the terminating the equipment. As shown, the distal end of the cable assembly 100 (opposite the pulling assembly 110) preferably comprises a connector assembly 112 that terminates the optical fibers passing through the corresponding flexible cable 104. However, this is not a requirement as terminating configurations other than the connector assembly 112 may be employed. Furthermore, as described in greater detail below, once the pulling assembly 110 has been used to properly install the cable assembly 110 in sufficient proximity to the terminating equipment, the module construction of the rear base (element 702; see FIG. 7) forming a part of the pulling assembly 110 allows a connector assembly to be installed in place of the pulling assembly 110. In this manner, ready connection of the optic fibers to the terminating equipment may be achieved.

Referring now to FIG. 2, the cable assembly 100 of FIG. 1 (with the exception of the high count fiber optic cable 102) is illustrated without the various assemblies or sleeving described above. In particular, the high count fiber optic cable 102 is seen to terminate in a pair of cable ferrules 202, 204 that, in turn, are coupled to corresponding breakout assemblies 206, 208. The breakout assemblies 206, 208 allow the fiber optic ribbons 210 to pass there through. The cable ferrules 202, 204 mate with their corresponding breakout assemblies 206, 208 thereby providing a substantially rigid enclosure for passing through the fiber optic ribbons 210 and for terminating the structural and environment members of the outdoor cable 102. As shown the fiber optic ribbons 210 extend from either end of the outdoor cable 102 and, consequentially, from the respective breakout assemblies 206, 208 and are terminated with fiber optic ferrules 214, such as the exemplary MT ferrules illustrated in FIGS. 7–9 or any other suitable fiber optic ferrules. In a presently preferred embodiment, the intermediate lengths of each fiber optic ribbon 210 between the breakout assemblies 206, 208 and their respective terminating ferrules 214 are fully encased in a protective (though flexible) jacket 213 attached using crimps 212 as known in the art. The protective jackets 213 each provide a degree of environmental and mechanical protection for a corresponding one of the fiber optic ribbons 210. Although not shown in FIG. 2, the protective jackets 213 are terminated within the respective breakout assemblies 206, 208 in a similar fashion using additional crimps 212. Preferably, the crimps 212 are staggered along the length of the fiber optic ribbons 210 as shown. As described in further detail below, this allows the crimps 212 to be secured in corresponding recesses formed within the breakout assemblies 206, 208 and the connector assemblies 112.

Figure 4:
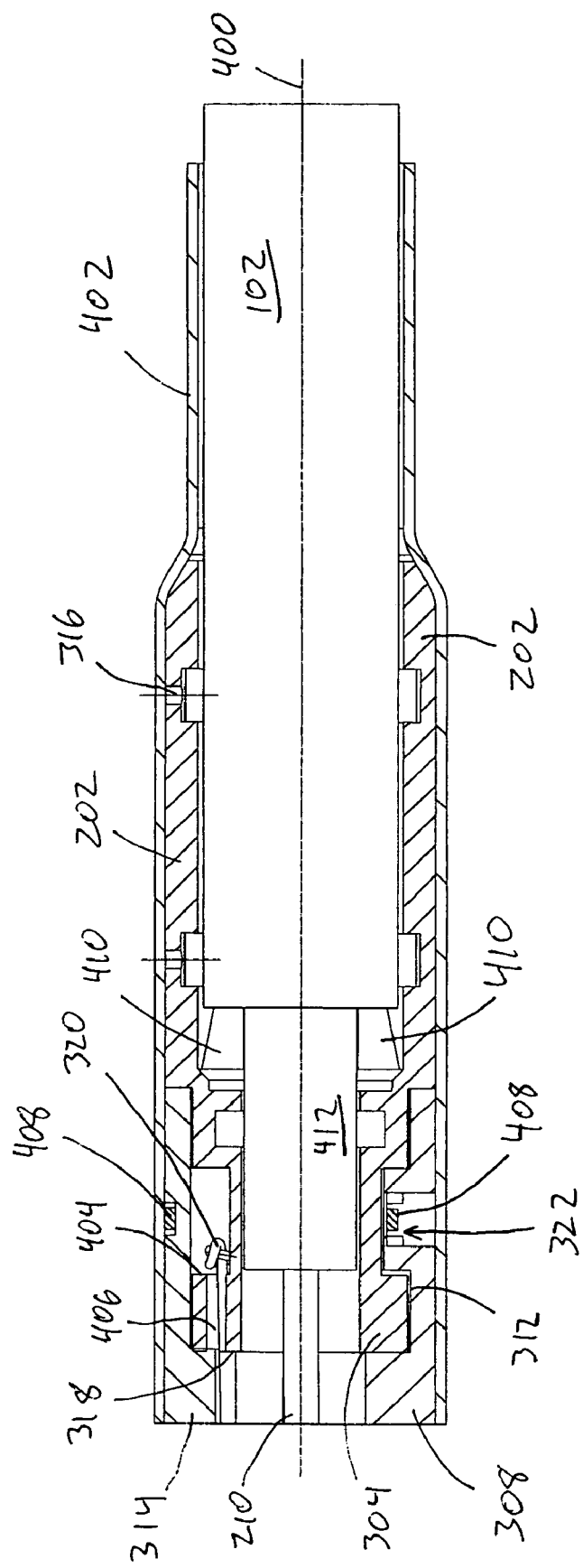
FIG. 4 is a partial, vertical cross-sectional view of the adapter assembly of FIG. 3.
Figure 5:
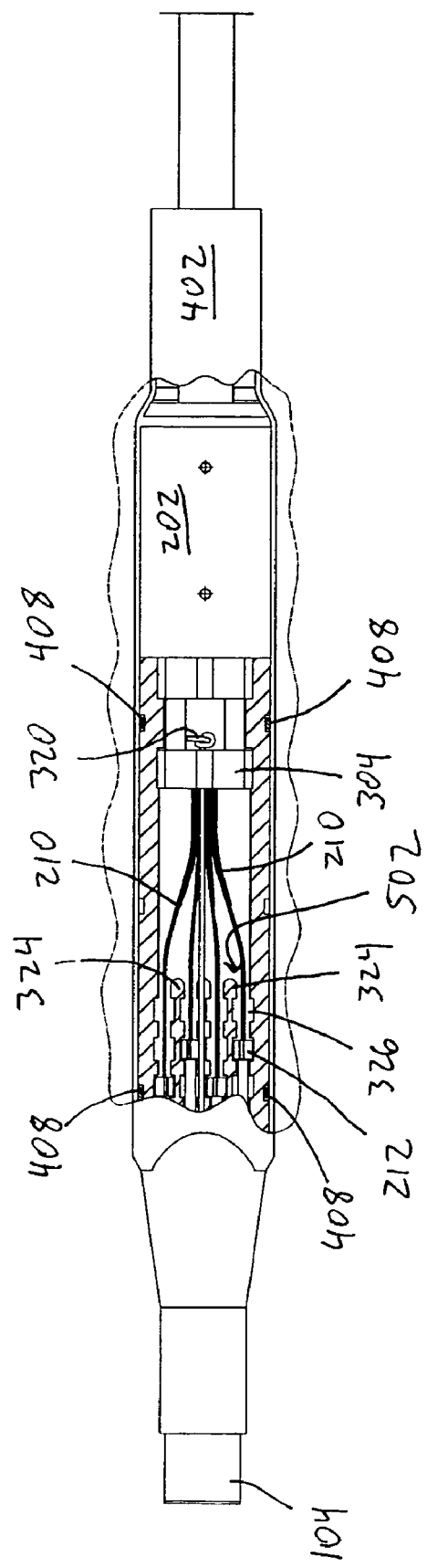
FIG. 5 is a top down, partial cut-away view of the adapter assembly of FIG. 3.

Referring now to FIGS. 3–5, a first embodiment of a breakout (or adapter) assembly 300 in accordance with the present invention is illustrated. In particular, the assembly 300 comprises a cable ferrule 202 coupled to an open breakout body 308, each preferably fabricated of aluminum with nickel plating. The cable ferrule 202 preferably comprises a tubular body 302 having a passage extending from a back opening (for receiving the cable 102) to a front opening (for passage of the fiber optic ribbons 210). A flange 304 is formed in an exterior surface 306 of the cable ferrule 202 proximate the front opening. In a presently preferred embodiment, the flange 304 is formed along the entire circumference of the tubular body 302 and concentric to a longitudinal axis of the cable ferrule 202, although this is not a requirement. The breakout body 308 comprises an open longitudinal channel 310, between first and second open ends, that defines an interior surface in which a groove 312, proximate the first open end, is formed. The groove 312 has dimensions substantially similar to the flange 304 thereby allowing the flange to mate with the groove 312 and thereby maintain the cable ferrule 202 and breakout body 308 in substantially fixed axial and rotational alignment. In a presently preferred embodiment, both the flange 304 and groove 312 comprise complimentary mating surface profiles such as the hexagonal profiles illustrated in FIGS. 3 and 5. In a similar vein, the other surfaces forming the external surface 306 of the cable ferrule 220 may likewise be configured to provide mating engagement with corresponding surfaces along the interior surface of the breakout body 308.

The breakout body 308 additionally comprises one or more partitions 324 disposed within the longitudinal channel 310 as shown. The partitions may be formed integrally with the breakout body 308 or may comprise separate components (preferably fabricated from the same material as the breakout body 308) that are subsequent attached to the breakout body 308. The partitions 324 establish one or more courses (element 502; see FIG. 5) in relation to each other and/or the interior surface of the breakout body 308. Furthermore, the partitions 324 and/or interior surface of the breakout body 308 may have retention recesses 326 formed therein. As shown, the crimps 212 placed on the fiber optic ribbons 210 can be aligned with corresponding ones of the retention recesses 326 to thereby maintaining the fiber optic ribbons 210 in a substantially fixed coaxial alignment relative to each other.

As shown in FIGS. 3 and 4, a pulling member 320 such as a stainless steel cable or other device capable of withstanding relatively high tensions (e.g., approximately 400 lbs. of pulling force), is threaded through an opening 406 provided between a front surface 318 and back surface 404 of the flange 304. Note that, by securing the pulling member 320 in this fashion, tension applied to the cable assembly 101 via a pulling assembly 110 (described in further detail below) may be transferred through the pulling member 320 to the more robust strength members 410 of the high count fiber optic cable 102 rather than the comparatively delicate fiber optic ribbons 210.

In order to completely enclose the longitudinal channel 310, a breakout body cover 314 is provided. Although not shown in the FIGs., the breakout body cover 314 preferably comprises interior surfaces that cooperate with the flange 304, i.e., are complementary to the mating surfaces of the flange 304. Preferably, the breakout body cover 314 and the breakout body 308 comprise one or more outer grooves 322 formed in exterior surfaces thereof, as illustrated. When the breakout body cover 314 is mated with the breakout body 308, the outer grooves 322 align to form one or more circumferential grooves. Thereafter, fastening bands, such as steel ties or the like may be used to secure the breakout body cover 314 in fixed alignment with the breakout body 308. In the manner, the breakout body 308 and breakout body cover 314 forms a substantially rigid, enclosed cavity within which the fiber optic ribbons 210 may be secured.

Further aspects of the first embodiment of the breakout assembly are illustrated in FIGS. 3 and 4. As shown, the high count fiber optic cable 102 is aligned along a longitudinal axis 400 of the cable ferrule 202. As further shown, the cable ferrule 202 comprises one or more radial openings 316 which provide access to the interior of the cable ferrule 202. In a present preferred embodiment, once the outdoor cable 102 has been placed within the cable ferrule 202, an epoxy or similar bonding material is injected into the one or more radial openings 316 to thereby securely attach the cable ferrule 202 to the exterior of the high count fiber optic cable 102. As shown, the strength members 410 and internal jacket 412 of the outdoor cable 102 are terminated within the cable ferrule 202, whereas the plurality of fiber optic ribbons 210 are allowed to pass there through. FIG. 4 further illustrates the mating relationship of the flange 304 in the groove 312. Additionally, an exemplary band 408, as described above, is shown received within one of the outer grooves 322 present in the breakout body 308 and breakout body cover 314. Finally, FIG. 4 also illustrates an outer cover 402 used to encase the breakout assembly as described previously. In a presently preferred embodiment, the outer cover 402 comprises shrink wrap applied to the completed assembly.

Figure 6:
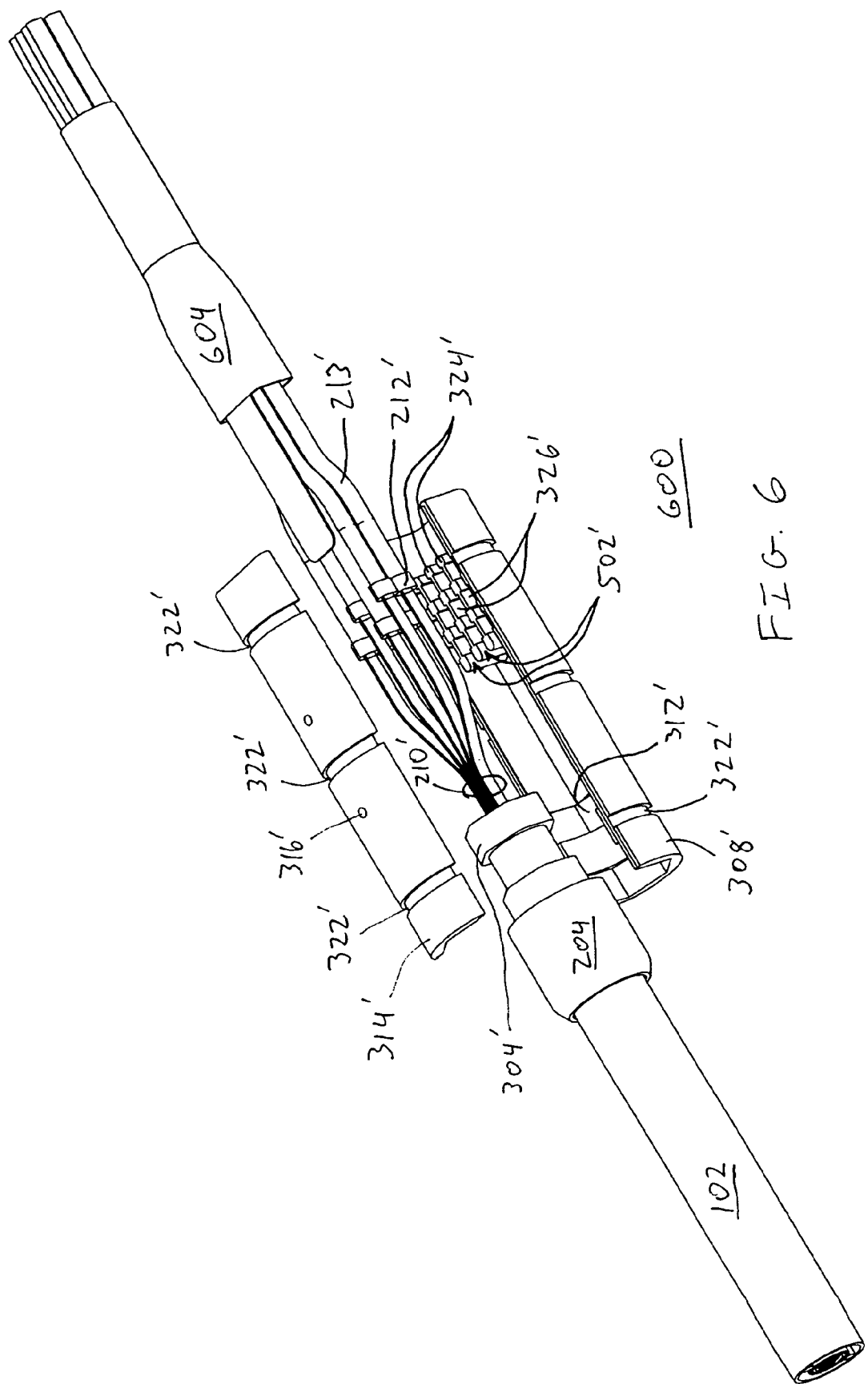
FIG. 6 is an exploded, prospective view of a second embodiment of an adapter assembly in accordance with the present invention.

Referring now to FIG. 6, another embodiment of the breakout assembly 600 comprising an alternate cable ferrule 204 is shown. In substantially all aspects, the elements illustrated in FIG. 6 are substantially identical to those illustrated in FIGS. 3–5, as denoted through the use of the prime notation in FIG. 6. In particular, the alternate cable ferrule 204 as illustrated in FIG. 6 differs from the previously described cable ferrule 202 in that it does not include an opening formed in the flange 304 for attachment of a corresponding pulling member 320. Furthermore, the alternate cable ferrule 204 does not comprise, in presently preferred embodiment, one or more radial openings for the placement of a bonding agent, as described above, although this is not a requirement. Note that the protective jacket 213 is terminated 604 at the breakout assembly 600. Further still, although the breakout assembly 600 is illustrated using the alternate cable ferrule 204, it is possible that a cable ferrule of the type illustrated in FIGS. 3–5 could be equally employed.

Figure 7:
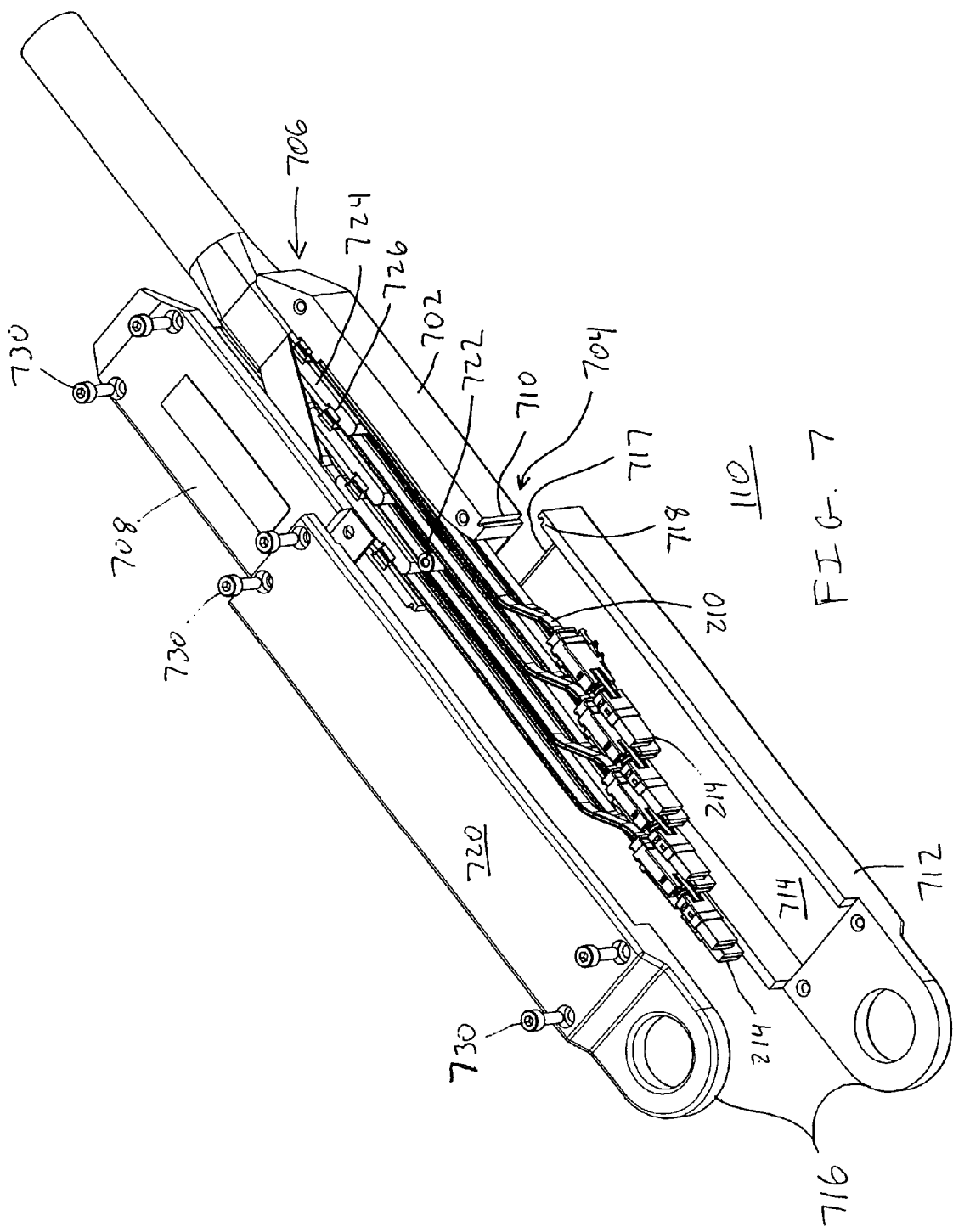
FIG. 7 is an exploded, perspective view of a pulling assembly in accordance with the present invention.
Figure 8:
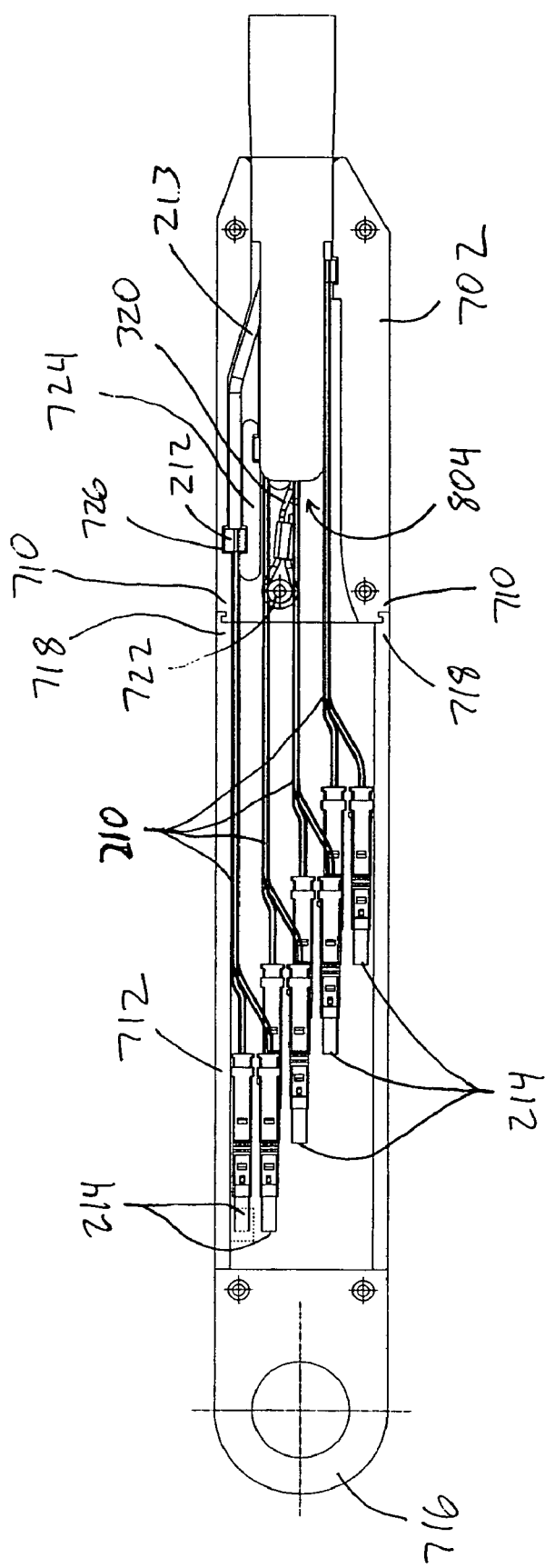
FIG. 8 is a top-down view of a rear base and front pulling base of a pulling assembly in accordance with the present invention and in which corresponding covers of the rear base and front pulling base have been removed.
Figure 9:
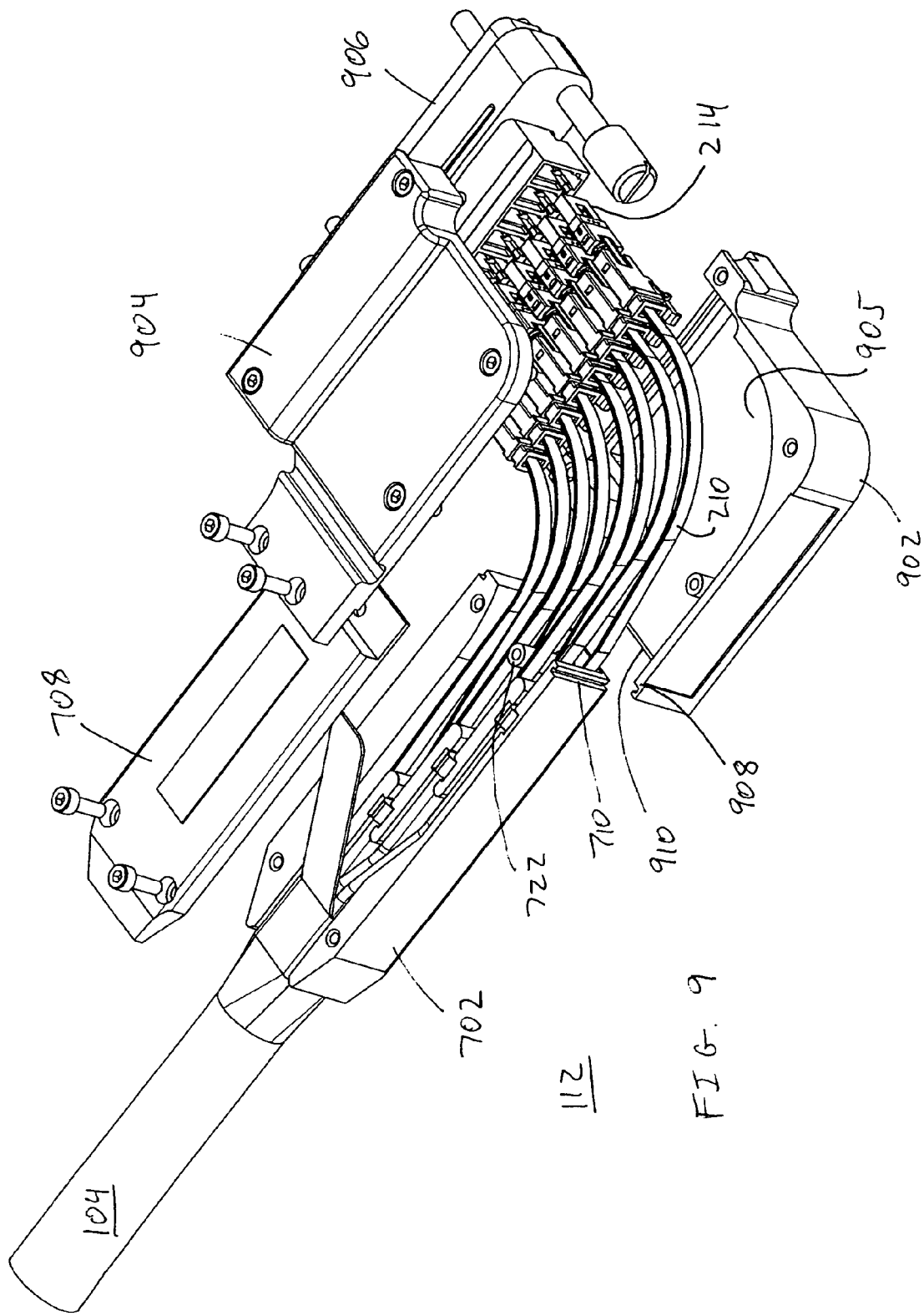
FIG. 9 is an exploded, perspective view of a connector assembly in accordance with the present invention.

Referring now to FIGS. 7–9, a pulling assembly 110 and a connector assembly 112 are illustrated in further detail. In particular, both the pulling assembly 110 and connector assembly 112 comprise a rear base 702 and corresponding rear base cover 708. As best shown in FIG. 7, the rear base 702 comprises a front end 704 and a back end 706 having an open longitudinal channel 804 formed therein between the respective ends. A first coupling portion 710 is disposed near the front end 704 and preferably comprises, as shown, a tongue and groove arrangement for slidably mating with complimentary coupling portions as described in further detail below. Within the open longitudinal channel 804 of the rear base 702, one or more partitions 724 and retention recesses 726 are provided. Note that the partitions 724 provided in the rear base 702 are substantially identical in form and function to the partitions 324 provided in the breakout body 308, described above. Furthermore, a post 722, preferably formed integrally with the rear base 702, is provided. As best seen in FIG. 8, the post 722 is configured to receive an opposite end of the pulling member 320 thereby allowing any tensional force applied to the rear base 702 to be consequently applied through the pulling member 320 to the cable ferrule 202, as described previously.

A rear base cover 708 is provided to enclose the open longitudinal channel 804 formed in the rear base 702 and is preferably secured to the rear base 702 using one or more screws 730. When a pulling configuration is used, as shown in FIGS. 7 and 8, a front pulling base 712 is coupled to the rear base 702 via a second coupling portion 718 disposed proximate a rear opening of the front pulling base 712. Note that the second coupling portion 718 comprises complimentary surfaces relative to the first coupling portion 710, preferably a complementary tongue and groove arrangement as shown. In the example shown, the first coupling portion 710 will slidably engage the second coupling portion 718 until rear base 702 abuts a lip 717 formed at the distal end of the rear opening of the front pulling base 712. Although a tongue and groove embodiment is illustrated for the respective coupling portions 710, 718, those having ordinary skill in the art will appreciate that other arrangements capable of maintaining the front pulling base 712 and rear base 702 is fixed longitudinal alignment (notwithstanding any pulling forces applied to the front pulling base 712) may be equally employed.

A first cavity 714 is provided within the front pulling base 712 and is configured to receive the plurality of fiber optic cables 210 and corresponding fiber optic ferrules 214. Note that the crimps 712 provided in the fiber optic ribbons 210 are retained in axial alignment within the retention recesses 726 as described above. Both the front pulling base 712 and a front pulling cover 720 configured to enclose the first cavity 714 when secured to the rear base 702, comprise a pulling portion 716 that allow connection of a pulling device, such as a rope or similar mechanism to the pulling assembly 110. Although the pulling portion 716 is illustrated as an eye, those skilled in the art will appreciate that other implementations such as a hook, threaded stud or similar mechanisms may be equally employed.

Referring now to FIG. 9, the connector assembly 112 in accordance with the present invention is further illustrated. As shown, the rear base 702, instead of being coupled to the front pulling base 712, is coupled to a front backshell base 902 and a corresponding backshell cover 904 as shown, again, each preferably fabricated from aluminum with nickel plating. The connector head 906, as new in the art, is provided for mounting the plurality of fiber optic ferrules 214. The connector head 906 is securely mounted within the second cavity established by the front backshell base 902 and front backshell cover 904. Note that, with the exception of the detachable rear base 702, the front backshell base 902, backshell cover 904 and connector head 906 are substantially similar in design to the connector assembly disclosed in U.S. Pat. No. 6,751,392 entitled "Cable Management System For Connector Assemblies" and having the same assignee as the instant invention ("the '392 patent"). As noted, and in contrast to the '392 patent, the front backshell base 902 is removable from the rear base 702. To this end, the front backshell base 902 comprises a third coupling portion 908 disposed in proximity to a rear opening of the front backshell base 902. The third coupling portion 908 comprises complimentary surfaces for mating with the first coupling portion 710 of the rear base 702. Once again, the third coupling portion 908 preferably comprises a tongue and groove arrangement for slidable mating with the first coupling portion 710, as well as a lip 910 for limiting advancement of the rear base 702 as it is coupled to the front backshell base 902. Note that, in an alternative embodiment, the lips 717, 910, rather than being incorporated into the front pulling base 712 and the front backshell base 902, may instead be incorporated into the rear base 702, thereby limiting travel of the respective bases 712, 902 when suitably mounted on the rear base 702. Regardless, the backshell base 902 comprises a cavity 905 for receiving the plurality of optical fibers 210, thereby allowing the fiber optic ferrules 214 to be routed toward and mounted within the connector head 906.

The present invention provides a mechanism for terminating inflexible high count fiber optic cables and transitioning them into more flexible indoor configurations in a relatively inexpensive manner. This is achieved, in one embodiment, through the use of breakout assemblies that terminate the strength and environmental protection members of the high count fiber optic cable (which contribute substantially to the relative stiffness of such cables) while allowing the constituent fiber optic ribbons to pass through. A connector assembly is further provided that allows a pulling member to be coupled to between the connector assembly and a corresponding breakout assembly, thereby allowing the resulting cable assembly to be installed (i.e., pulled through conduits) in a familiar manner. The connector assembly comprises modular components that allow a connector backshell to be incorporated, thereby facilitating termination of the fiber optic ribbons. In this manner, the present invention provides a relatively inexpensive solution in comparison to prior art approaches.

While the particular preferred embodiments of the present invention have been shown and described, it will be obvious to those skilled in the art that changes and modifications may be made without departing from the teachings of the invention. For example, the connector assembly illustrated herein has been shown as a right angle connector. However, as those having skill in the art will appreciate, connectors of other configurations may be equally incorporated. It is therefore contemplated that the present invention cover any and all modifications, variations or equivalents that fall within the spirit and scope of the basic underlying principles disclosed above and claimed herein.

What is claimed is:

1. An adapter assembly for terminating a fiber optic cable comprising a plurality of optic fibers, comprising:
   a cable ferrule comprising a tubular body forming a passage between a front opening and a back opening along a longitudinal axis, and a flange formed on an exterior surface of the cable ferrule and proximate the front opening, wherein the rear opening is configured to receive the fiber optic cable into the passage;
   a breakout body having a first open end and a second open end and an open longitudinal channel between the first and second open ends for receiving the plurality of optic fibers from the fiber optic cable, and further comprising a groove, in proximity to the first open end, disposed within an interior surface defined by the open longitudinal channel, wherein the groove is configured to matably receive the flange and substantially maintain the cable ferrule and the breakout body in fixed axial alignment along the longitudinal axis; and
   a breakout body cover configured to mate with the breakout body thereby substantially enclosing the open longitudinal channel.

2. The adapter assembly of claim 1, wherein the cable ferrule further comprises at least one radial opening in communication with the passage.

3. The adapter assembly of claim 1, wherein the groove and flange each comprise mating surface profiles configured to substantially maintain the cable ferrule and the breakout body in fixed rotational alignment.

4. The adapter assembly of claim 1, wherein the flange comprises a front surface and a back surface and an opening between the front surface and the back surface configured to receive a pulling member.

5. The adapter assembly of claim 1, wherein the breakout body and the breakout body cover each comprise at least one outer groove formed within respective exterior surfaces such that, when the breakout body cover mates with the breakout body, the at least one outer groove is aligned to form at least one circumferential groove around the breakout body and the breakout body cover.

6. The adapter assembly of claim 5, further comprising:
at least one band configured to be received within the at least one circumferential groove and affix the breakout body cover to the breakout body.

7. The adapter assembly of claim 1, wherein the breakout body further comprises at least one partition disposed longitudinally within the open longitudinal channel and defining at least two courses for receiving the plurality of optic fibers.

8. The adapter assembly of claim 7, wherein the breakout body further comprises at least one retention recess formed within the at least one partition and the interior surface of the elongate breakout body.

9. An assembly for terminating a plurality of optic fibers, the assembly comprising:
a rear base having a front end and a back end and an open longitudinal channel between the front and back ends for receiving the plurality of optic fibers from the fiber optic cable via the back end, and further comprising a first coupling portion disposed proximate the front end; and
a front pulling base comprising a first cavity for receiving the plurality of optic fibers, and further comprising a pulling portion for connection thereto of a pulling device and a second coupling portion disposed proximate an opening providing access to the first cavity, wherein the first coupling portion and the second coupling portion, during a pulling configuration of the assembly, fixedly engage complementary surfaces thereof to maintain the rear base and the front pulling base in longitudinal alignment.

10. The assembly of claim 9, further comprising:
a rear base cover configured to mate with the rear base thereby substantially enclosing the open longitudinal channel.

11. The assembly of claim 9, further comprising:
a front pulling cover configured to mate with the front pulling base thereby substantially enclosing the first cavity.

12. The assembly of claim 9, wherein the second coupling portion is configured to slidably engage the first coupling portion.

13. The assembly of claim 9, further comprising:
a front backshell base comprising a second cavity for receiving the plurality of optic fibers, and further comprising a front opening for terminating the plurality of optical fibers and a third coupling portion disposed proximate a rear opening providing access to the second cavity, wherein the first coupling portion and the third coupling portion, during a connector configuration of the assembly, fixedly engage complementary surfaces thereof to maintain the rear base and the front backshell base in longitudinal alignment.

14. The assembly of claim 13, further comprising:
a front backshell cover configured to mate with the front backshell base thereby substantially enclosing the second cavity.

15. The assembly of claim 13, wherein the third coupling portion is configured to slidably engage the first coupling portion.

16. The assembly of claim 9, wherein the rear base further comprises at least one partition disposed longitudinally within the open longitudinal channel and defining at least two courses for receiving the plurality of optic fibers.

17. The assembly of claim 16, wherein the rear base further comprises at least one retention recess formed within the at least one partition and an interior surface of the rear base.

18. The assembly of claim 9, wherein the rear base further comprises a post for terminating a pulling member.

19. The assembly of claim 18, wherein the post is disposed within the open longitudinal channel.

20. A fiber optic cable assembly comprising:
a high count fiber optic cable comprising strength and environmental protection members and a plurality of optical fibers;
an adapter assembly, positioned along a length of the high count fiber optic cable, coupled to and substantially terminating the strength and environmental members while allowing passage of the plurality of optical fibers therethrough, and further comprising means for securing a pulling member to the adapter assembly; and
a connector assembly, positioned at a distal end of the plurality of optical fibers corresponding to the adapter assembly and comprising means for securing the pulling member to the connector assembly, wherein tensional forces applied to the connector assembly, when in a pulling configuration, are transferred via the pulling member to the adapter assembly and the strength members of the high count fiber optic cable.

21. The fiber optic cable assembly of claim 20, further comprising:
flexible jacketing disposed between the adapter assembly and the connector assembly and substantially enclosing at least the plurality of optical fibers.

* * * * *